United States Patent [19]

Shibayama

[11] Patent Number: 5,760,958
[45] Date of Patent: Jun. 2, 1998

[54] COMPACT ZOOM LENS WITH ANTIVIBRATION FUNCTION

[75] Inventor: Atsushi Shibayama, Kawasaki, Japan

[73] Assignee: Nikon Corporation, Tokyo, Japan

[21] Appl. No.: 873,717

[22] Filed: Jun. 12, 1997

Related U.S. Application Data

[62] Division of Ser. No. 588,851, Jan. 19, 1996, abandoned, which is a continuation of Ser. No. 207,195, Mar. 8, 1994, abandoned.

[30] Foreign Application Priority Data

Mar. 10, 1993 [JP] Japan ................................. 5-049239

[51] Int. Cl.$^6$ ............................ G02B 27/64; G02B 15/14
[52] U.S. Cl. ........................ 359/557; 359/676; 359/692
[58] Field of Search ........................ 359/554–557, 359/676, 684, 685, 739–740, 686, 690–692

[56] References Cited

U.S. PATENT DOCUMENTS

| | | | |
|---|---|---|---|
| 4,844,600 | 7/1989 | Tokumaru | 359/684 |
| 4,908,639 | 3/1990 | Yanagisawa | 359/740 |
| 5,000,549 | 3/1991 | Yamazaki | 359/557 |
| 5,144,489 | 9/1992 | Shibayama | 359/692 |
| 5,168,403 | 12/1992 | Umeda et al. | 359/557 |
| 5,172,276 | 12/1992 | Ueyama et al. | 359/813 |
| 5,227,920 | 7/1993 | Shibayama et al. | 359/685 |
| 5,530,589 | 6/1996 | Sato | 359/557 |

FOREIGN PATENT DOCUMENTS

| | | | |
|---|---|---|---|
| 2-234115 | 9/1990 | Japan | 359/557 |
| 4-212916 | 8/1992 | Japan | 359/557 |

*Primary Examiner*—Thong Nguyen
*Attorney, Agent, or Firm*—Shapiro and Shapiro

[57] ABSTRACT

A zoom lens with antivibration function is provided, in the order from the object side, with a first lens group of a positive refractive power and a second lens group of a negative refractive power, which both axially move toward the object side with a reduction in the gap therebetween in the zooming operation from the wide angle end to the telephoto end. The focusing operation from a larger object distance to a smaller object distance is achieved by an axial movement of the second lens group while the first lens group remains still, while the blur in the taken image resulting from vibration is compensated by a movement of the first lens group in a direction substantially perpendicular to the optical axis.

14 Claims, 5 Drawing Sheets

FIG. 6A WIDE ANGLE END    DEFOCUS = -0.147

FIG. 6B INTERMEDIATE LENGTH    DEFOCUS = -0.237

FIG. 6C TELEPHOTO END    DEFOCUS = -0.182

COMPACT ZOOM LENS WITH ANTIVIBRATION FUNCTION

This is a division of application Ser. No. 08/588,851 filed Jan. 19, 1996, which is a continuation of application Ser. No. 08/207,195 filed Mar. 8, 1994, both of which are now abandoned.

BACKGROUND OF THE INVENTION

1. Field of the Invention

The present invention relates to a zoom lens with antivibration function, and more particularly to a compact zoom lens of light weight and low cost, adapted for use in a compact camera.

2. Related Background Art

In the field of compact cameras, advancements in various automations such as automatic exposure, automatic focusing, automatic winding and rewinding of the film have drastically reduced the failures in phototaking resulting from over- or underexposure or from defocus.

On the other hand, the compact cameras have become principally equipped with zoom lenses as the standard equipment, and, as a result of an increase in the focal length at the telephoto end, the possibility of camera shaking effects has increased. Therefore, most of the failures in phototaking now arise from such camera vibration.

As a countermeasure, there have been proposed various optical systems, in which a part of the phototaking optical system is moved perpendicularly to the optical axis thereby compensating the vibration at the phototaking operation. For example the U.S. Pat. No. 5,000,549 discloses a zoom lens adapted for use in a compact camera and having vibration compensation.

However, in the configuration disclosed in the above-mentioned U.S. Pat. No. 5,000,549, the first lens group is divided into two, namely a focusing group and an antivibration group. For this reason, although the zooming operation can be done in two lens groups, there are in fact required three lens chamber units. Also in order to maintain satisfactory lens performance in the focusing and the vibration compensating operations, the aberrations such as spherical and coma aberrations have to be corrected in each of the front and rear groups in the first lens group. For this reason, this lens requires a large number of lens components, 8–9 lenses at minimum, and is therefore difficult to achieve a lowered cost in manufacture.

Also the presence of the focusing mechanism, the diaphragm mechanism and the antivibration mechanism in the first lens group is an obstacle to size reduction in the designing of a compact camera.

SUMMARY OF THE INVENTION

In consideration of the foregoing, an object of the present invention is to provide a zoom lens with an antivibration mechanism, having a short entire lens length, a compact shape and a reduced number of lens components and adapted for compacting the entire camera and reducing the cost in manufacture.

The zoom lens of the present invention has, in the order from the object side, a first lens group of positive refractive power and a second lens group of negative refractive power. In the zooming operation from the wide angle end to the telephoto end, both lens groups are axially moved toward the object side, with the distance between the first and second lens groups being reduced. Also the focusing operation from a longer object distance to a shorter object distance is achieved by an axial movement of the second lens group toward the image plane, while the first lens group is stopped. The blur in the taken image resulting from vibration is compensated by a movement of the first lens group substantially perpendicularly to the optical axis. Furthermore, there is satisfied the following condition, wherein M2W is the imaging magnification of the second lens group at the wide angle end:

$$M2W > 1.25 \tag{1}$$

At the compensation of vibration, the diaphragm preferably stays still on the optical axis.

DETAILED DESCRIPTION OF THE INVENTION

In the present invention, in a zoom lens of two-group structure of positive and negative refractive powers, the first lens group constitutes an antivibration group for compensation of vibration, while the second lens group constitutes a focusing group.

The zoom lens of the present invention, being capable of reducing the entire length at the wide angle end because of the two-group structure of positive and negative refractive powers, is adapted for use in a compact camera. Also the separate arrangement of the antivibration group and the focusing group is advantageous for space utilization, since the driving mechanism for the antivibration group and that for the focusing group can be mutually distanced. Besides, since the driving mechanism for the focusing group, to be driven until immediately before the exposure can be positioned distanced from the driving mechanism for the antivibration group, to be driven during the exposure, there can be suppressed the driving error which may result from the mutual influence of both driving mechanisms, for example by resonance, in the focusing operation and in the vibration compensating operation.

Furthermore, since the first lens group serving as the antivibration group and the second lens group serving as the focusing group can be constructed respectively as independent units, there can be facilitated the assembly or inspection in each unit, and the assembly and adjustment of the entire camera. As a result, there can be obtained a compact, reliable and precise zoom lens with antivibration function, advantageous for cost reduction.

Also the diaphragm, positioned immediately behind the first lens group, allows to reduce the diameter of the lenses in the first and second lens groups. Furthermore, since the diaphragm mechanism can be separated from the driving mechanism for the antivibration group, the assembly and adjustment can be facilitated.

In the following there will be explained the condition (1) of the present invention.

The condition (1) defines the imaging magnification of the second lens group at the wide angle end of the zoom lens. Below the lower limit of the condition (1), the amount of movement of the second lens group at the focusing operation to a short object distance at the wide angle end increases, and the distance between the second lens group and the image plane becomes excessively small, leading to an increase in the diameter of lenses in the second lens group. As a result, the compactization becomes undesirably difficult.

In case of aiming at a higher zooming ratio of about 2 or higher (namely in case of $f_T/f_W \geq 2$ wherein $f_W$ and $f_T$ are focal lengths respectively at the wide angle end and the telephoto end), it is desirable to provide the condition (1) with an upper limit and select said upper limit as 1.45. Above said upper limit, the imaging magnification of the second lens group increases significantly in the zooming operation from the wide angle end to the telephoto end, so that the tolerances for the play of the first lens group in the axial movement and for the zooming cam in the manufacture become undesirably narrow.

In the above-explained zoom lens of the present invention, the aforementioned diaphragm remains preferably still in the eccentric motion of the first lens group for compensating the blur in the taken image resulting from vibration, in order to avoid variations in the aberrations and to attain satisfactory imaging performance. It is thus rendered possible to intercept the light beam leading to coma flare, which tends to appear when the first lens group is eccentrically moved.

For suppressing the variations in aberrations when the first lens group is eccentrically moved for compensation of vibration, the first lens group is preferably composed, in the order from the object side, of a positive first lens component of meniscus shape convex to the object side, a negative second lens component of biconcave shape, a positive third lens component of biconvex shape, and a positive fourth lens component of biconvex shape. It is particularly preferable that said 2nd negative lens component and said 3rd positive lens component are mutually adhered. Such configuration of the first lens group makes it possible to correct the spherical and coma aberrations within the first lens group, and to suppress the variations in aberrations in the entire zoom lens when the first lens group is eccentrically moved.

For achieving further improved performance in the above-explained configuration, there is preferably satisfied the following additional conditions:

$$-0.2 < L/fl < 0.1 \quad (2)$$

$$D/fl < 0.1 \quad (3)$$

wherein L is the distance from the rear principal point of the first lens group to the last lens face thereof, fl is the focal length of the first lens group, and D is the air gap between the 3rd positive lens component and the 4th positive lens component, all measured positive from the object side toward the image side.

The condition (2) defines the arrangement of refractive forces of the lens components constituting the first lens group. Below the lower limit of the condition (2), the asymmetry of said arrangement of refractive forces increases, whereby the correction of the spherical and coma aberrations within the first lens group becomes difficult. As a result, the imaging performance when the first lens group is eccentrically moved for the compensation of vibration becomes undesirably deteriorated. On the other hand, above the upper limit of said condition (2), the air gap between the first and second lens groups decreases, so that an increase in the zooming ratio becomes difficult. Although the range of the above-mentioned condition is desirable, it is further preferable to select the upper and lower limits of said condition (2) respectively as 0.05 and −0.1.

Also the condition (3) defines the arrangement of refractive forces of the lens components constituting the first lens group. Above the upper limit of said condition (3), the convex face at the image side of the 3rd lens component becomes significantly separated from the convex face at the object side of the 4th lens component, whereby the correction of the spherical aberration becomes difficult. Said upper limit is more preferably selected as 0.05.

Furthermore, in order to achieve a compact configuration in the zoom lens of the present invention, the second lens group is preferably composed, in the order from the object side, of a positive 5th lens component of meniscus shape concave to the object side, and a negative 6th lens component of meniscus shape concave to the object side. It is furthermore preferable, in improving the imaging performance, constitute at least a lens face in the second lens group with an aspherical surface of such shape that increases the positive refractive power in the peripheral part. Otherwise the second lens group is composed, in the order from the object side, of a positive 5th lens component of meniscus shape concave to the object side, a negative 6th lens component concave to the object side, and a negative 7th lens component of meniscus shape concave to the object side, and such configuration is advantageous for improving the performance of the zoom lens and attaining a higher zooming ratio.

In the compensation of the blur in the taken image resulting from vibration, the amount s of blur of the taken image on the image plane can be represented by the following equation (4):

$$s = f \cdot \tan \epsilon \quad (4)$$

wherein f is an arbitrary focal length within the range from the wide angle end to the telephoto end of the zoom lens of the present invention, and $\epsilon$ is the inclination angle of the entire zoom lens at said focal length in a plane containing the optical axis.

However, if the inclination angle $\epsilon$ is sufficiently smaller than 1, the blur amount s can be given by the following equation (4'):

$$s = f \cdot \epsilon \quad (4')$$

Also the deflection z of the paraxial ray on the image plane can be represented by the following equation (5):

$$z = y \cdot \beta 2 \quad (5)$$

wherein $\beta 2$ is the imaging magnification of the second lens group, and y is the amount of movement, in the direction perpendicular to the optical axis, of the first lens group for compensation of vibration.

Since $\beta 2 = f/fl$ wherein fl is the focal length of the first lens group, the equation (5) can be rewritten as (5'):

$$z = y \cdot f/fl \quad (5')$$

When the zoom lens is inclined by the angle $\epsilon$, the amount s of image blur can be compensated by moving the first lens group perpendicularly to the optical axis in such a manner that s=−z is satisfied. In this operation, the following equation (6) is obtained between the inclination angle ε and the amount y of movement, based on the equations (4') and (5'):

$$y = -\varepsilon \cdot f1 \quad (6)$$

The antivibration can be achieved by moving the first lens group so as to satisfy the equation (6).

In the following there will be explained embodiments of the present invention.

[Embodiment 1]

Figure 1:
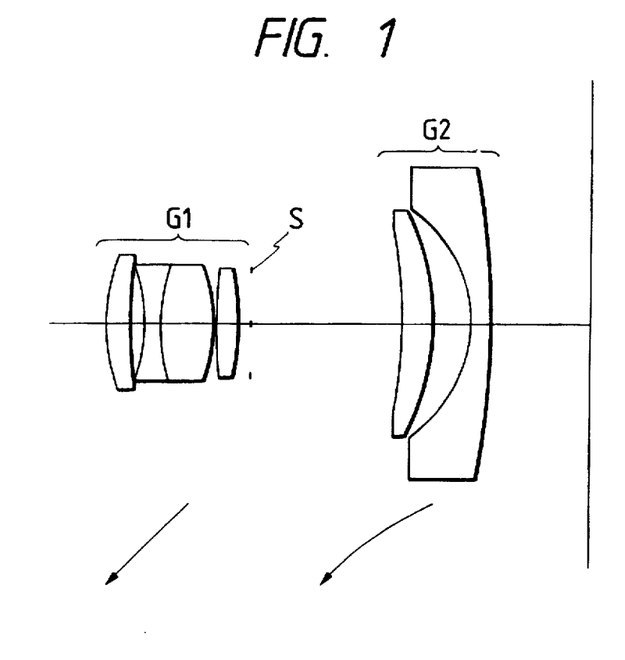
FIG. 1 is a view showing the lens configuration of an embodiment 1 of the present invention.

FIG. 1 shows the lens configuration of an embodiment 1 of the present invention. A positive first lens group G1 is composed, in the order from the object side, of a 1st positive lens component of meniscus shape convex to the object side, a 2nd negative lens component of biconcave shape, a 3rd positive lens component of biconvex shape, and a 4th positive lens component of biconvex shape having a more strongly curved face at the image side, wherein the 2nd and 3rd lens components are mutually adhered. A negative second lens group G2 is composed, in the order from the object side, of a 5th positive lens component of meniscus shape concave to the object side, and a 6th negative lens component of meniscus shape concave to the object side, wherein the face of said 5th lens component at the object side is composed of an aspherical surface. A diaphragm S is positioned immediately behind the first lens group G1.

The following Table 1 shows parameters of the embodiment 1 of the present invention, wherein f stands for the focal length, F for F-number and 2ω for the angle of field. The numbers at the left-hand column indicate the order from the object side. Also r stands for the radius of curvature of a lens face, d for the distance of the lens faces, n and ν respectively for the refractive index and the Abbe's number for d-line (λ=587.6 nm).

Also the aspherical surface shape is represented by:

$$x = (h^2/r)/[1+\{1-k \cdot (h/r)^2\}^{1/2}] + c2 \cdot h^2 + c4 \cdot h^4 + c6 \cdot h^6 + c8 \cdot h^8 + c10 \cdot h^{10}$$

taking the X-axis in the axial direction, the H-axis in a direction perpendicular to the optical axis and the proceeding direction of light as positive, wherein r stands for the paraxial radius of curvature, h for the height from the optical axis, c2, c4, c6, c8 and c10 for the aspherical coefficients, and k for the conical constant. The aspherical surface is indicated by a mark (*) attached to the right of the face number.

The amount of movement of the second lens group in the focusing operation is represented as positive for a movement toward the image plane. R stands for the phototaking distance, and β for the phototaking magnification.

TABLE 1

Parameters of the embodiment 1
f = 36.02 − 68.02
F = 3.92 − 7.40
2ω = 60.28 − 35.14

| | r | d | ν | n |
|---|---|---|---|---|
| 1 | 16.576 | 2.10 | 53.9 | 1.71300 |
| 2 | 37.117 | 1.45 | | |
| 3 | −16.032 | 1.30 | 45.0 | 1.74400 |
| 4 | 16.151 | 4.80 | 69.9 | 1.51860 |
| 5 | −15.887 | .30 | | |
| 6 | 80.564 | 2.10 | 58.5 | 1.61272 |
| 7 | −24.119 | 1.10 | | |
| 8 | diaphragm (d8) | | | |

TABLE 1-continued

Parameters of the embodiment 1
f = 36.02 − 68.02
F = 3.92 − 7.40
2ω = 60.28 − 35.14

| | r | d | ν | n |
|---|---|---|---|---|
| 9* | −34.746 | 2.90 | 37.0 | 1.81474 |
| 10 | −21.007 | 3.70 | | |
| 11 | −11.731 | 1.40 | 49.5 | 1.74443 |
| 12 | −79.006 | (B.f) | | |

The aspherical shape of the 9th face is indicated in the following:

| Conical constant; | k = 0.0000 |
|---|---|
| Aspherical coefficients; | c2 = 0.0000 |
| | c4 = 0.2011 × 10⁻⁴ |
| | c6 = 0.3018 × 10⁻⁶ |
| | c8 = 0.1649 × 10⁻⁸ |
| | c10 = 0.1644 × 10⁻¹⁰ |

Variations in the gaps in the zooming operation are indicated below:

| f | 36.0207 | 50.0100 | 68.0205 |
|---|---|---|---|
| d8 | 13.5671 | 7.1371 | 2.7532 |
| B.f | 9.1463 | 24.3519 | 43.9284 |

The moving amount of the second lens group in the focusing operation is shown below:

| f = 36.0207 | | Moving amount |
|---|---|---|
| R = 1451.778 | (β = −0.0250) | 1.4020 |
| R = 1000.000 | (β = −0.0363) | 2.1447 |
| f = 50.0100 | | Moving amount |
| R = 2051.266 | (β = −0.0250) | 0.5558 |
| R = 1000.000 | (β = −0.0527) | 1.1912 |
| f = 68.0205 | | Moving amount |
| R = 2794.930 | (β = −0.0250) | 0.3370 |
| R = 1000.000 | (β = −0.0735) | 1.0010 |

In the following there are shown values corresponding to the aforementioned conditional relations:

(1) M2W = 1.3051
(2) L/f1 = −0.0055
(3) D/f1 = 0.011

Figure 2A:
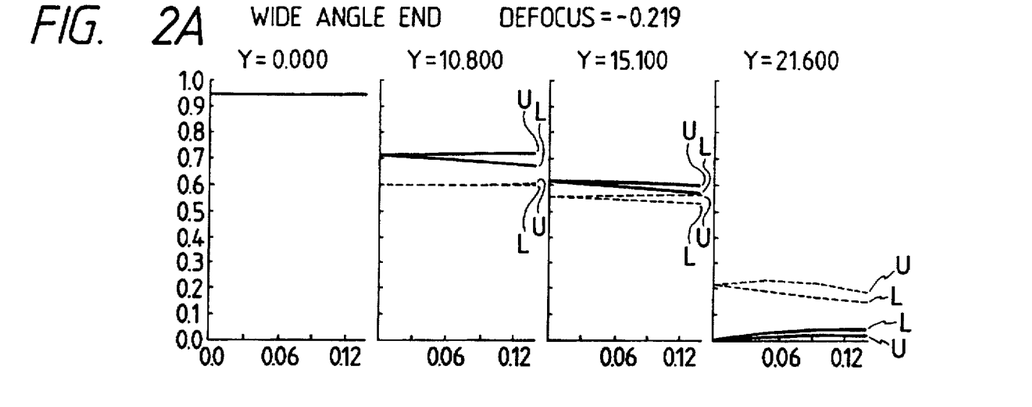
FIGS. 2A, 2B and 2C are charts showing variations in MTF in the antivibrating operation in the embodiment 1 of the present invention.
Figure 2B:
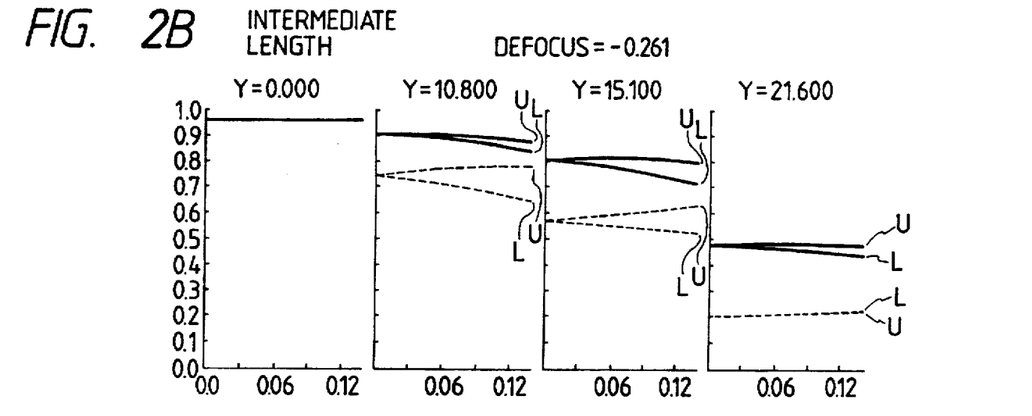
Figure 2C:
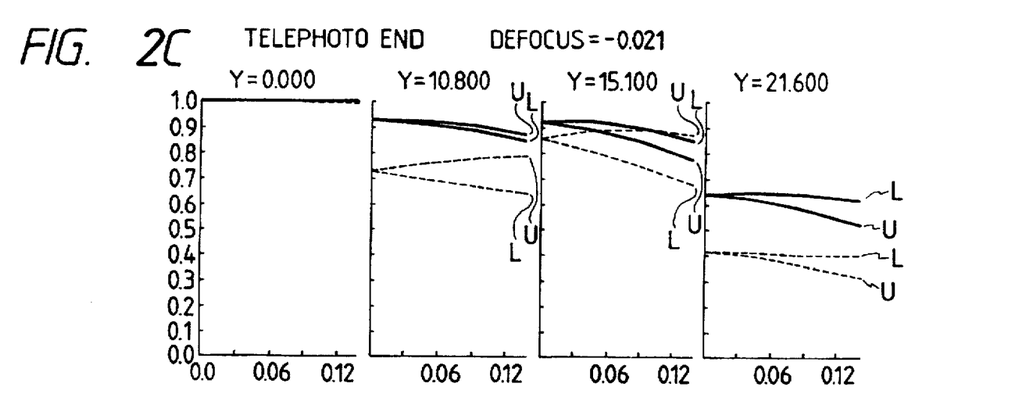

FIGS. 2A to 2C show variations in the MTF (modulation transfer function) when the first lens group is eccentrically moved in a direction perpendicular to the optical axis, in a meridional cross section, at the vibration compensating operation. More specifically, FIGS. 2A, 2B and 2C show the MTF's respectively at a phototaking magnification β=−0.025 at the wide angle end of the embodiment 1, at a phototaking magnification β=−0.025 at an intermediate focal length, and at a phototaking magnification β=−0.025 at the telephoto end of the embodiment 1. In each chart, the ordinate indicates the MTF value at 20 line/mm for d-line, and the abscissa indicates the amount y of movement of the first lens group, serving as the antivibration group, in a direction perpendicular to the optical axis. On the chart, the maximum amount of movement corresponds to an inclination angle ε=0.005 radian induced by vibration, and the MTF in each chart is shown on a plane where the MTF reaches maximum at the center of the image plane (Y=0). Also in FIGS. 2A to 2C, DEFOCUS stands for the defocus amount for the Gaussian image plane, Y for the image height, U for the MTF curve at the upper side of the center of the image plane (same as the direction of eccentric motion of the first lens group), and L for the MTF curve at the lower side of the center of the image plane (opposite to the direction of eccentric motion of the first lens group). In each chart, solid lines indicate the sagittal image plane while broken lines indicate the meridional image plane.

[Embodiment 2]

Figure 3:
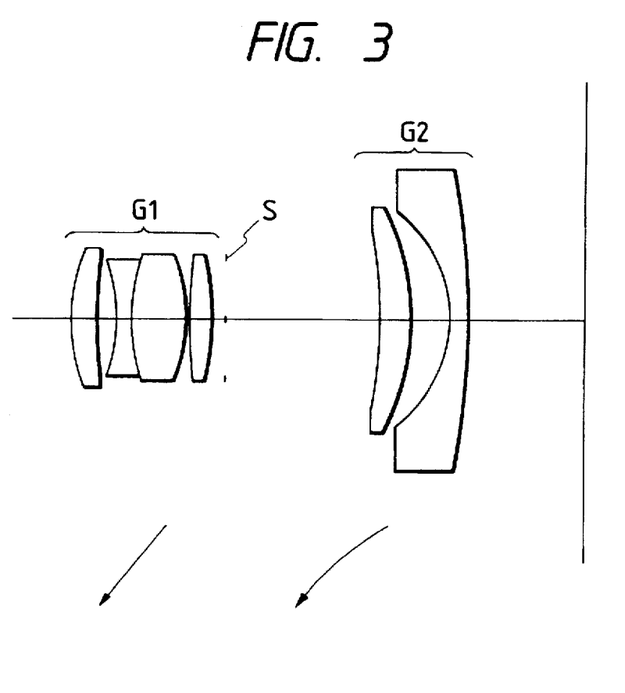
FIG. 3 is a view showing the lens configuration of an embodiment 2 of the present invention.

FIG. 3 shows the lens configuration of an embodiment 2, wherein a positive first lens group G1 is composed, in the order from the object side, of a first positive lens component of meniscus shape convex to the object side, a 2nd negative lens component of biconcave shape, a 3rd positive lens component of biconvex shape, and a 4th positive lens component of biconvex shape with a more strongly curved face at the image side, wherein the 2nd and 3rd lens components are mutually adhered. A negative second lens group G2 is composed, in the order from the object side, of a 5th positive lens component of meniscus shape concave to the object side, and a 6th negative lens component of meniscus shape concave to the object side, wherein the face of the 5th lens component at the object side is composed of an aspherical surface. A diaphragm S is positioned immediately behind the first lens group G1.

The following Table 2 shows parameters of the embodiment 2 of the present invention, wherein f stands for the focal length, F for f-number and 2ω for the angle of field. The numbers at the left-hand column indicate the order from the object side. Also r stands for the radius of curvature of a lens face, d for the distance of the lens faces, n and σ respectively for the refractive index and the Abbe's number for d-line (λ=587.6 nm).

Also the aspherical surface shape is represented by:

$$x=(h^2/r)/[1+\{1-k \cdot (h/r)^2\}^{1/2}]+c2 \cdot h^2+c4 \cdot h^4+c6 \cdot h^6+c8 \cdot h^8+c10 \cdot h^{10}$$

taking the X-axis in the axial direction, the H-axis in a direction perpendicular to the optical axis and the proceeding direction of light as positive, wherein r stands for the paraxial radius of curvature, h for the height from the optical axis, c2, c4, c6, c8 and c10 for the aspherical coefficients, and k for the conical constant. The aspherical surface is indicated by mark (*) attached to the right of the face number.

The amount of movement of the second lens group in the focusing operation is represented as positive for a movement toward the image plane. R stands for the phototaking distance, and β for the phototaking magnification.

TABLE 2

Parameters of the embodiment 2
f = 39.00 − 78.00
F = 3.84 − 7.68
2ω = 56.52 − 30.91

|   | r       | d         | ν    | n       |
|---|---------|-----------|------|---------|
| 1 | 16.583  | 2.20      | 50.2 | 1.72000 |
| 2 | 32.920  | 1.70      |      |         |
| 3 | −16.653 | 1.30      | 45.0 | 1.74400 |
| 4 | 14.589  | 5.00      | 69.9 | 1.51860 |
| 5 | −17.054 | 0.30      |      |         |
| 6 | 50.065  | 2.20      | 60.3 | 1.51835 |
| 7 | −21.143 | 1.20      |      |         |

TABLE 2-continued

Parameters of the embodiment 2
f = 39.00 − 78.00
F = 3.84 − 7.68
2ω = 56.52 − 30.91

|    | r              | d      | ν    | n       |
|----|----------------|--------|------|---------|
| 8  | diaphragm (d8) |        |      |         |
| 9* | −38.606        | 2.90   | 37.0 | 1.81474 |
| 10 | −21.052        | 3.70   |      |         |
| 11 | −11.437        | 1.40   | 51.1 | 1.73350 |
| 12 | −75.218        | (B f)  |      |         |

The aspherical shape of the 9th face is indicated in the following:

| Conical constant:      | k = 0.0000               |
|------------------------|--------------------------|
| Aspherical coefficients: | c2 = 0.0000            |
|                        | c4 = 0.2326 × 10$^{-4}$  |
|                        | c6 = 0.4102 × 10$^{-6}$  |
|                        | c8 = 0.3652 × 10$^{-8}$  |
|                        | c10 = 0.3180 × 10$^{-10}$|

Variations in the gaps in the zooming operation are indicated below:

| f   | 39.0012 | 55.0018 | 77.9996 |
|-----|---------|---------|---------|
| d8  | 14.0363 | 7.5383  | 2.8683  |
| B.f | 10.5819 | 27.2705 | 51.2573 |

The moving amount of the second lens group in the focusing operation is shown below:

| f = 39.0012  |                | Moving amount |
|--------------|----------------|---------------|
| R = 1576.815 | (β = −0.0250)  | 1.2762        |
| R = 900.000  | (β = −0.0440)  | 2.4043        |
| f = 55.0018  |                | Moving amount |
| R = 2255.599 | (β = −0.0250)  | 0.5312        |
| R = 900.000  | (β = −0.0651)  | 1.4137        |
| f = 77.9996  |                | Moving amount |
| R = 3127.222 | (β = −0.0250)  | 0.3117        |
| R = 900.000  | (β = −0.0955)  | 1.2059        |

In the following there are shown values corresponding to the aforementioned conditional relations:

M2W=1.3495  (1)

L/fl=−0.0110  (2)

D/fl=0.010  (3)

Figure 4A:
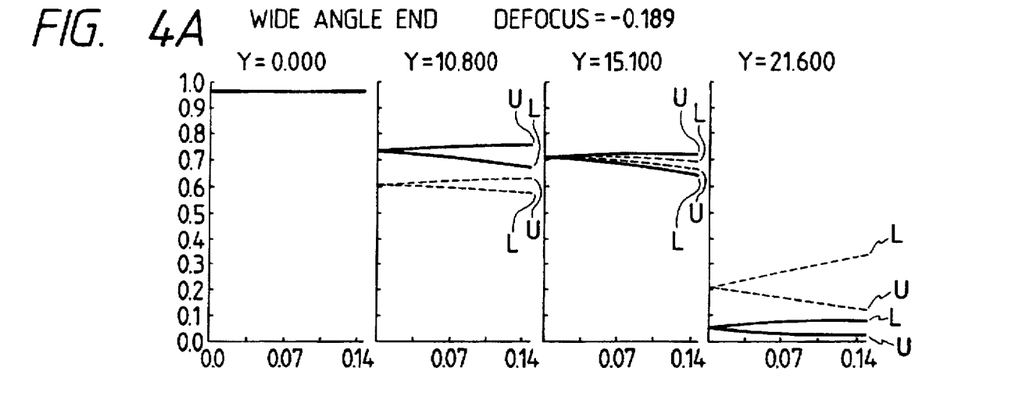
FIGS. 4A, 4B and 4C are charts showing variations in MTF in the antivibrating operation in the embodiment 2 of the present invention.
Figure 4B:
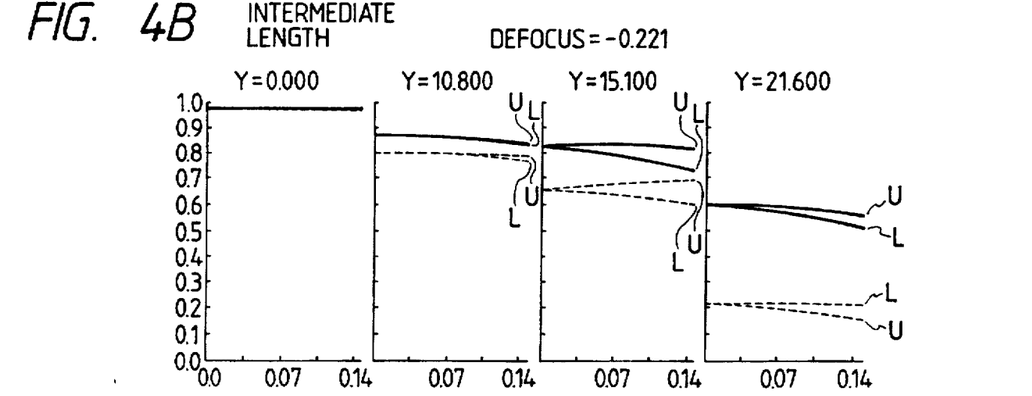
Figure 4C:
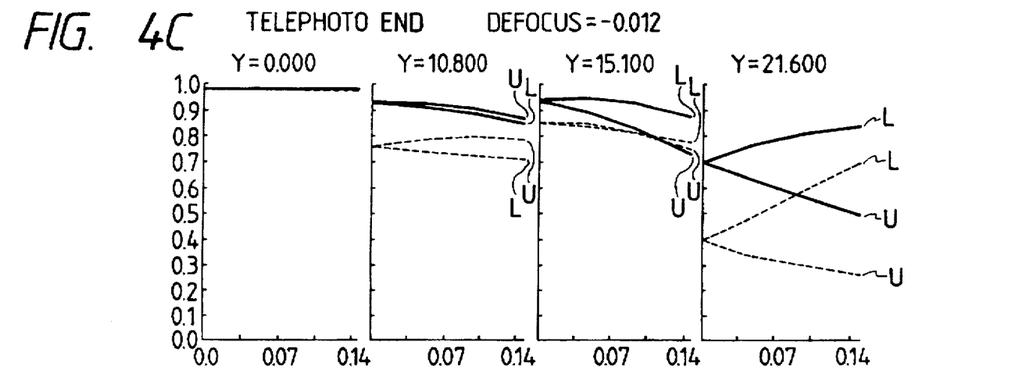

As in FIGS. 2A to 2C, FIGS. 4A to 4C show variations in the MTF when the first lens group is eccentrically moved in a direction perpendicular to the optical axis, in a meridional cross section, at the vibration compensating operation. More specifically, FIGS. 4A, 4B and 4C show the MTF's respectively at a phototaking magnification β=−0.025 at the wide angle end of the embodiment 2, at a phototaking magnification β=−0.025 at an intermediate focal length, and at a phototaking magnification β=−0.025 at the telephoto end of the embodiment 2.

[Embodiment 3]

Figure 5:
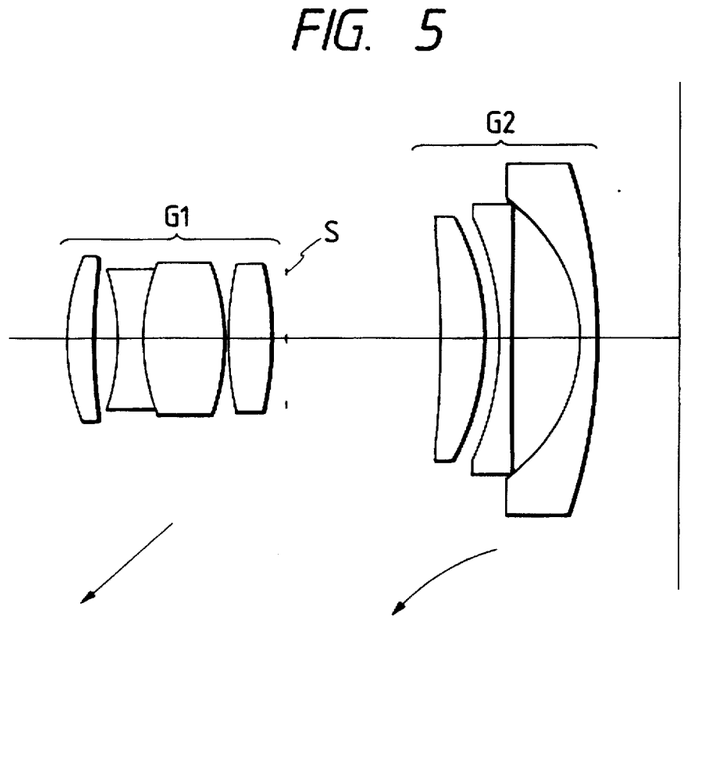
FIG. 5 is a view showing the lens configuration of an embodiment 3 of the present invention.

FIG. 5 shows the lens configuration of an embodiment 3 of the present invention, wherein a positive first lens group G1 is composed, in the order from the object side, of a 1st positive lens component of meniscus shape convex to the object side, a 2nd negative lens component of biconcave shape, a 3rd positive lens component of biconvex shape, and a 4th positive lens component of biconvex shape with a more strongly curved face at the object side, wherein the 2nd and 3rd lens components are mutually adhered. A negative second lens group G2 is composed, in the order from the object side, of a 5th positive lens component of meniscus shape concave to the object side, a 6th negative lens component of biconcave shape with a more strongly curved face at the object side, and a 7th negative lens component of meniscus shape concave to the object side. A diaphragm S is positioned immediately behind the first lens group G1.

The following Table 3 shows parameters of the embodiment 3 of the present invention, wherein f stands for the focal length, F for F-number and 2ω for the angle of field. The numbers at the left-hand column indicate the order from the object side. Also r stands for the radius of curvature of a lens face, d for the distance of the lens faces, n and σ respectively for the refractive index and the Abbe's number for d-line (λ=587.6 nm).

The amount of movement of the second lens group in the focusing operation is represented as positive for a movement toward the image plane. R stands for the phototaking distance, and β for the phototaking magnification.

TABLE 3

Parameters of the embodiment 3
f = 39.00 – 87.38
F = 3.82 – 8.55
2ω = 56.23 – 27.74

| | r | d | ν | n |
|---|---|---|---|---|
| 1 | 17.147 | 2.20 | 54.6 | 1.51454 |
| 2 | 46.703 | 2.00 | | |
| 3 | –18.818 | 2.30 | 49.4 | 1.77279 |
| 4 | 16.517 | 7.00 | 69.9 | 1.51860 |
| 5 | –16.409 | .30 | | |
| 6 | 30.082 | 3.70 | 82.6 | 1.49782 |
| 7 | –35.224 | 1.20 | | |
| 8 | diaphragm (d8) | | | |
| 9 | –101.873 | 3.80 | 35.2 | 1.74950 |
| 10 | –20.490 | 1.30 | | |
| 11 | –22.677 | 1.10 | 39.8 | 1.86994 |
| 12 | 4993.416 | 6.00 | | |
| 13 | –13.767 | 1.30 | 67.9 | 1.59319 |
| 14 | –46.307 | (B.f) | | |

Variations in the gaps in the zooming operation are indicated below:

| f | 38.9993 | 54.9988 | 87.3802 |
|---|---|---|---|
| d8 | 13.1796 | 7.5746 | 2.5116 |
| B.f | 7.2273 | 21.6210 | 50.7523 |

The moving amount of the second lens group in the focusing operation is shown below:

| f = 38.9993 | | Moving amount |
|---|---|---|
| R = 1574.265 | (β = –0.0250) | 1.2934 |
| R = 1000.000 | (β = –0.0393) | 2.1608 |
| f = 54.9988 | | Moving amount |
| R = 2256.868 | (β = –0.0250) | 0.5324 |
| R = 1000.000 | (β = –0.0581) | 1.2626 |
| f = 87.3802 | | Moving amount |
| R= 3587.882 | (β = –0.0250) | 0.2694 |
| R = 1000.000 | (β = –0.0959) | 1.0449 |

In the following there are shown values corresponding to the aforementioned conditional relations:

(1) M2W = 1.3494
(2) L/f1 = –0.0478
(3) D/f1 = 0.010

Figure 6A:
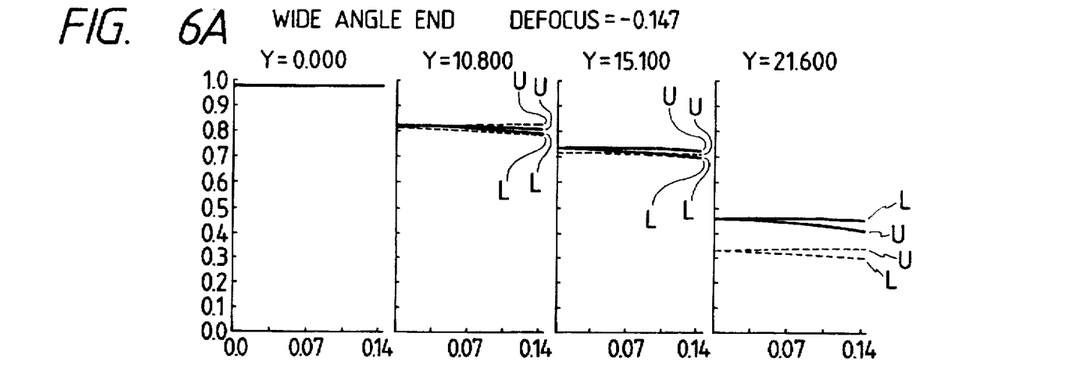
FIGS. 6A, 6B and 6C are charts showing variations in MTF in the antivibrating operation in the embodiment 3 of the present invention.
Figure 6B:
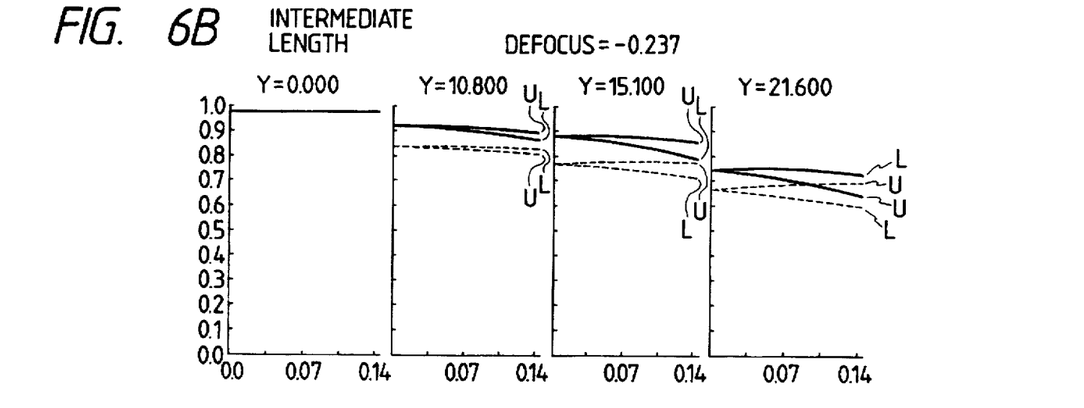
Figure 6C:
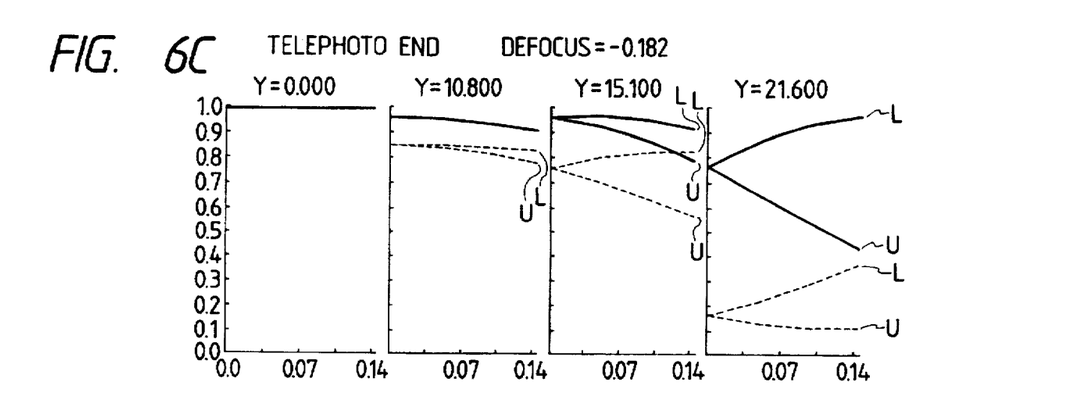

As in FIGS. 2A to 2C, FIGS. 6A to 6C show variations in the MTF when the first lens group is eccentrically moved in a direction perpendicular to the optical axis, in a meridional cross section, at the vibration compensating operation. More specifically, FIGS. 6A, 6B and 6C show the MTF's respectively at a phototaking magnification β=–0.025 at the wide angle end of the embodiment 3, at a phototaking magnification β=–0.025 at an intermediate focal length, and at a phototaking magnification β=–0.025 at the telephoto end of the embodiment 3.

As explained in the foregoing, the present invention can provide a zoom lens with antivibration function, with a reduced number of lens components, adapted for cost reduction and for size reduction, therefore adapted for use in a compact camera.

What is claimed is:

1. A compact zoom lens with antivibration function, comprising, in the order from an object side, a first lens group of a positive refractive power and a second lens group of a negative refractive power, wherein:

a zooming operation, from a wide angle end to a telephoto end, is achieved by axial movement of both said first and second lens groups toward the object side with a reduction in a gap between said lens groups;

a focusing operation, from a larger object distance to a smaller object distance, is achieved by an axial movement of said second lens group toward an image plane while said first lens group remains still;

blur in an image resulting from vibration is compensated by a movement of said first lens group in a direction substantially perpendicular to an optical axis of the zoom lens;

the following conditions are satisfied:

$$1.25 < M2W < 1.45$$

$$f_T/f_W \geq 2$$

where

M2W: imaging magnification of said second lens group at the wide angle end;

$f_T$: focal length of the zoom lens at the telephoto end;

$f_W$: focal length of the zoom lens at the wide angle end, and said first lens group includes, in order from the object side, a 1st positive lens component of meniscus shape convex to the object side, a 2nd negative lens component of biconcave shape, a 3rd positive lens component of biconvex shape, and a 4th positive lens component of biconvex shape.

2. A zoom lens according to claim 1, wherein said 2nd and 3rd lens components are mutually adhered.

3. A zoom lens according to claim 2, further satisfying following conditions:

$$-0.2 < L/f1 < 0.1$$

$$D/f1 < 0.1$$

wherein

L: distance from the rear principal point of the first lens group to the final lens face thereof, represented as positive when measured axially from the object side to the image side;

f1: focal length of the first lens group; and

D: air gap between the 3rd positive lens component and the 4th positive lens component.

4. A zoom lens according to claim 3, further satisfying the following condition:

$$-0.1 < L/f1 < 0.05.$$

5. A zoom lens according to claim 3, further satisfying the following condition:

$$D/f1 < 0.05.$$

6. A zoom lens according to claim 2, wherein said second lens group includes, in the order from the object side, a 5th positive lens component of meniscus shape concave to the object side, and a 6th negative lens component of meniscus shape concave to the object side.

7. A zoom lens according to claim 6, wherein said second lens group includes at least an aspherical surface of such shape that the positive refractive power increases in the peripheral area.

8. A zoom lens according to claim 2, wherein said second lens group includes, in the order from the object side, a 5th positive lens component of meniscus shape concave to the object side, a 6th negative lens component concave to the object side, and a 7th negative lens component of meniscus shape concave to the object side.

9. A zoom lens according to claim 8, wherein a diaphragm is provided between said first and second lens groups, wherein, in the zooming operation from the wide angle end toward the telephoto end, said diaphragm integrally moves with said first lens group along the optical axis, and, in the focusing operation from the larger object distance to the smaller object distance, said diaphragm remains still together with said first lens group.

10. A zoom lens according to claim 9, wherein said diaphragm remains still on the optical axis at the compensation of vibration.

11. A compact zoom lens with antivibration function, comprising a first lens group of a positive refractive power and a second lens group of a negative refractive power in the order from an object side, and a diaphragm positioned between said first and second lens groups, wherein:

in a zooming operation from a wide angle end to a telephoto end, said first and second lens groups both move axially toward the object side with a reduction in the gap between said lens groups, while said diaphragm axially moves integrally with said first lens group;

a focusing operation, from a larger object distance to a smaller object distance, is achieved by an axial movement of said second lens group toward an image plane while said first lens group and said diaphragm remain still;

blur in a taken image resulting from vibration is compensated by a movement of said first lens group in a direction substantially perpendicular to an optical axis, while said diaphragm remains still on the optical axis;

said first lens group includes, in the order from the object side, a 1st positive lens component of meniscus shape convex to the object side, a 2nd negative lens component of biconcave shape, a 3rd positive lens component of biconvex shape, and a 4th positive lens component of biconvex shape, in which said 2nd and 3rd lens components are mutually adhered;

said second lens group includes, in the order from the object side, a 5th positive lens component of meniscus shape concave to the object side, and a 6th negative lens component of meniscus shape concave to the object side, in which at least a lens face therein is composed of an aspherical shape of such shape that the positive refractive power increases in the peripheral portion; and following conditions are further satisfied:

$$M2W > 1.25$$

$$-0.2 < L/f1 < 0.1$$

$$D/f1 < 0.1$$

$$f_T/f_w \geq 2$$

wherein:

M2W: imaging magnification of said second lens group at the wide angle end;

L: distance from the rear principal point of the first lens group to the final lens face thereof, represented as positive when measured axially from the object side to the image side;

f1: focal length of the first lens group;

D: air gap between the 3rd positive lens component and the 4th positive lens component;

$f_T$: focal length of the zoom lens at the telephoto end; and $f_w$: focal length of the zoom lens at the wide angle end.

12. A zoom lens according to claim 11, further satisfying following conditions:

$$1.25 < M2W < 1.45$$

$$-0.1 < L/f1 < 0.05$$

$$D/f1 < 0.05.$$

13. A compact zoom lens with antivibration function, comprising a first lens group of a positive refractive power and a second lens group of a negative refractive power in the order from an object side, and a diaphragm positioned between said first and second lens groups, wherein:

in a zooming operation from a wide angle end to a telephoto end, said first and second lens groups both axially move toward the object side with a reduction in the gap between said lens groups, while said diaphragm axially moves integrally with said first lens group;

a focusing operation, from a larger object distance to a smaller object distance, is achieved by an axial movement of said second lens group toward an image plane while said first lens group and said diaphragm remain still;

blur in a taken image resulting from vibration is compensated by a movement of said first lens group in a direction substantially perpendicular to an optical axis, while said diaphragm remains still on the optical axis;

said first lens group includes, in the order from the object side, a 1st positive lens component of meniscus shape convex to the object side, a 2nd negative lens component of biconcave shape, a 3rd positive lens component of biconvex shape, and a 4th positive lens component of biconvex shape, in which said 2nd and 3rd lens components are mutually adhered;

said second lens group includes, in the order from the object side, a 5th positive lens component of meniscus shape concave to the object side, a 6th negative lens component concave to the object side, and a 7th negative lens component of meniscus shape concave to the object side; and following conditions are further satisfied:

$M2W > 1.25$ $-0.2 < L/fl < 0.1$ $D/fl < 0.1$ $f_T/f_w \geq 2$ wherein:

M2W: imaging magnification of said second lens group at the wide angle end;

L: distance from the rear principal point of the first lens group to the final lens face thereof, represented as positive when measured axially from the object side to the image side;

fl: focal length of the first lens group;

D: air gap between the 3rd positive lens component and the 4th positive lens component;

$f_T$: focal length of the zoom lens at the telephoto end; and $f_w$: focal length of the zoom lens at the wide angle end.

14. A zoom lens according to claim 13, further satisfying following conditions:

$1.25 < M2W < 1.45$ $-0.1 < L/fl < 0.05$ $D/fl < 0.05$.

* * * * *